(12) United States Patent
Wu

(10) Patent No.: US 8,310,448 B2
(45) Date of Patent: Nov. 13, 2012

(54) WHEEL MOUSE

(75) Inventor: Chun-Che Wu, Taipei (TW)

(73) Assignee: Primax Electronics, Ltd., Taipei (TW)

( * ) Notice: Subject to any disclaimer, the term of this patent is extended or adjusted under 35 U.S.C. 154(b) by 490 days.

(21) Appl. No.: 12/434,045

(22) Filed: May 1, 2009

(65) Prior Publication Data

US 2010/0238113 A1 Sep. 23, 2010

(30) Foreign Application Priority Data

Mar. 20, 2009 (TW) ................................ 98109043 A

(51) Int. Cl.
*G06F 3/033* (2006.01)
*G09G 5/08* (2006.01)
(52) U.S. Cl. ...................................................... 345/163
(58) Field of Classification Search ........... 345/163–166
See application file for complete search history.

(56) References Cited

U.S. PATENT DOCUMENTS

| | | | | |
|---|---|---|---|---|
| 7,061,471 | B2* | 6/2006 | Bohn | 345/163 |
| 2006/0033715 | A1* | 2/2006 | Chou | 345/163 |
| 2006/0092135 | A1* | 5/2006 | Chou et al. | 345/163 |
| 2006/0123362 | A1* | 6/2006 | Keely | 715/857 |
| 2007/0139377 | A1* | 6/2007 | Chiang et al. | 345/163 |
| 2007/0146311 | A1* | 6/2007 | Lin et al. | 345/156 |
| 2007/0159462 | A1* | 7/2007 | Yen et al. | 345/163 |
| 2009/0189861 | A1* | 7/2009 | Ledbetter et al. | 345/163 |
| 2009/0231274 | A1* | 9/2009 | Blandin | 345/156 |

* cited by examiner

*Primary Examiner* — Jeff Piziali
(74) *Attorney, Agent, or Firm* — Kirton McConkie; Evan R. Witt

(57) ABSTRACT

A wheel mouse includes a base, a circuit board, a scroll wheel, a wheel swing member, two tilt switches, and a mode-switching element. The wheel swing member has an extension arm. The mode-switching element has an engaging part. The mode-switching element is penetrated through the base and the circuit board and partially protruded outside the surface of the base. By moving the mode-switching element to a first position or a second position, the engaging part is engaged with or separated from the extension arm, so that the wheel mouse is selectively operated in a third-axial wheel operating mode or a tilt wheel operating mode.

15 Claims, 5 Drawing Sheets

WHEEL MOUSE

FIELD OF THE INVENTION

The present invention relates to a wheel mouse, and more particularly to a wheel mouse operable in two wheel operating modes.

BACKGROUND OF THE INVENTION

With rapid development of electronic and information industries, computers and the peripheral devices thereof become essential parts in our daily lives. For example, mice are important peripheral devices of computers because they can establish contact between the personal computers and the users. For helping the user well operate the computer, many novel mice with expanded functions are developed in views of humanization and user-friendliness.

Generally, commercially available wheel mice are usually classified into two major types. By rotating a scroll wheel of the first type wheel mouse, the third-axial rotating function is activated to permit for a single axial (e.g. either horizontal or vertical) scrolling operation of the computer screen. For most wheel mice, the single axial scrolling operation is set to be a vertical scrolling operation of the computer screen. The second type wheel mouse is also referred as a tilt wheel mouse. In addition to the third-axial rotating function by rotating a scroll wheel, the scroll wheel of the tilt wheel mouse may be tilted toward the left side or the right side to control a four axial scrolling operation of the computer screen. That is, the tilt wheel mouse may control both horizontal scroll movement and vertical scroll movement of the images shown on the computer screen.

Hereinafter, the configurations of a conventional third-axial wheel mouse will be illustrated with reference to FIG. 1. FIG. 1 is a schematic perspective view illustrating the internal portion of a conventional third-axial wheel mouse. As shown in FIG. 1, the wheel mouse 1 principally comprises a base 10, a supporting element 11, a left-button switch 12, a right-button switch 13, a wheel switch 14, a scroll wheel 15, a wheel shaft 16 and an encoder 17. The supporting element 11 is disposed on the base 10. The wheel shaft 16 is penetrated through the scroll wheel 15 and supported on the supporting element 11. By rotating the scroll wheel 15 in the rotating direction A, the wheel shaft 16 is rotated with respect to the supporting element 11. Corresponding to the locations of a left click button (not shown), a right click button (not shown) and a first end of the wheel shaft 16, the left-button switch 12, the right-button switch 13 and the wheel switch 14 are respectively disposed on the base 10. The left click button and the right click button are mounted on an upper cover (not shown) of the wheel mouse 1. The upper cover further has an opening, and the scroll wheel 15 is partially protruded outside the opening such that the scroll wheel 15 can be manipulated by a user. In addition, a second end of the wheel shaft 16 is inserted into an encoder 17. Upon rotation of the scroll wheel 15, the encoding disc inside the encoder 17 is rotated to generate a wheel rotation signal. In response to the wheel rotation signal, the image shown on the computer screen is correspondingly scrolled.

Hereinafter, the configurations of a conventional tilt wheel mouse will be illustrated with reference to FIG. 2. FIG. 2 is a schematic perspective view illustrating the internal portion of a conventional tilt wheel mouse. The tilt wheel mouse 2 comprises a base 20, a first supporting element 21, a second supporting element 22, a left-button switch 23, a right-button switch 24, a wheel switch 25, a left-side tilt switch 26, a right-side tilt switch (not shown), a scroll wheel 27, a wheel shaft 271, an encoder 28 and a wheel swing member 29. The first supporting element 21 and the second supporting element 22 are disposed on the base 20 for supporting the wheel swing member 29. The wheel shaft 271 is supported on the wheel swing member 29 such that the scroll wheel 27 is partially accommodated within the wheel swing member 29. The first supporting element 21 and the second supporting element 22 are respectively arranged at the front end and the rear end of the scroll wheel 27. As a result, the scroll wheel 27 may be tilted toward the left or right side. The left-button switch 23, the right-button switch 24, the wheel switch 25, the left-side tilt switch 26 and the right-side tilt switch (not shown) are disposed on the base 20. In response to the depressing actions of the left-button switch 23, the right-button switch 24 and the wheel switch 25 and the left-side or right-side swinging action of the scroll wheel 27, the left-button switch 23, the right-button switch 24, the wheel switch 25, the left-side tilt switch 26 and the right-side tilt switch are respectively triggered to generate corresponding switching signals.

A first end of the wheel swing member 29 is supported on the first supporting element 21. A second end of the wheel swing member 29 is formed as the triggering shaft 292, which is disposed above the wheel switch 25. In a case that the scroll wheel 27 is pressed down, the triggering shaft 292 of the wheel swing member 29 is moved downwardly to trigger the wheel switch 25, thereby generating a switching signal. Furthermore, a receptacle 291 is formed in the wheel swing member 29 for accommodating the encoder 28.

The main differences between the tilt wheel mouse of FIG. 2 and the third-axial wheel mouse of FIG. 1 include the orientations of the supporting elements and the presence or absence of the wheel swing member. As previously described, the supporting element 11 of the third-axial wheel mouse 1 is perpendicular to the rotating direction A of the scroll wheel 15 such that the scroll wheel 15 is rotatable by the user. Whereas, in addition to third-axial rotation, the scroll wheel 27 of the tilt wheel mouse 2 can be tilted toward the left or right side. For tilting the scroll wheel 27 toward the left or right side, the wheel swing member 29 of the tilt wheel mouse 2 is necessary, and the first supporting element 21 and the second supporting element 22 for supporting the wheel swing member 29 are arranged in parallel with the rotation direction of the scroll wheel 27.

In some instance, some users prefer using the tilt wheel mouse 2 because the tilt wheel mouse has more functions. On the other hand, most users still get use to operating the third-axial wheel mouse 1 but fail to skillfully operate the tilt wheel mouse 2. In a case that many users share a public computer, the use of the third-axial wheel mouse 1 or the tilt wheel mouse 2 alone fails to comply with all users' requirements.

Therefore, there is a need of providing a wheel mouse operable in two wheel operating modes so as to obviate the drawbacks encountered from the prior art.

SUMMARY OF THE INVENTION

It is an object of the present invention to provide a wheel mouse operable in a third-axial wheel operating mode or a tilt wheel operating mode, wherein the tilt wheel operating mode is selectively enabled or disabled as required.

In accordance with an aspect of the present invention, there is provided a wheel mouse. The wheel mouse includes a base, a circuit board, a first tilt switch, a scroll wheel, a wheel swing member and a mode-switching element. The base has a bottom hole and a first supporting element. The circuit board is disposed on the base and has a board hole. The first tilt switch is disposed on a first side of the circuit board. The wheel swing member is disposed on the base for accommodating the scroll wheel and permitted to be swung with respect to the base. A first end of the wheel swing member is connected to the first supporting element. The wheel swing member has an extension arm arranged above the first tilt switch. The mode-switching element is penetrated through the bottom hole and the board hole, and includes an engaging part. If the mode-switching element is located in a first position, the engaging part is engaged with the extension arm, so that the wheel swing member is immobile and the wheel mouse is in a third-axial wheel operating mode. Whereas, if the mode-switching element is located in a second position, the engaging part is separated from the extension arm, so that the wheel swing member is permitted to be swung and aid wheel mouse is in a tilt wheel operating mode.

In an embodiment, the wheel mouse further includes an encoder. When the scroll wheel is rotated, the encoder generates a wheel rotation signal.

In an embodiment, the scroll wheel further includes a rotating shaft inserted into the encoder and rotated with the scroll wheel, so that the encoder generates the wheel rotation signal when the scroll wheel is rotated.

In an embodiment, the wheel swing member further includes a receiving part beside the wheel swing member for accommodating the encoder.

In an embodiment, the extension arm is integrally formed with the wheel swing member.

In an embodiment, the base further includes a first retaining recess and a second retaining recess beside the bottom hole.

In an embodiment, the mode-switching element further includes a protruding part to be inserted into the first retaining recess or the second retaining recess to fix the mode-switching element. When the protruding part is inserted into the first retaining recess, the mode-switching element is located in the first position. When the protruding part is inserted into the second retaining recess the mode-switching element is located in the second position.

In an embodiment, the first supporting element has a perforation. The first end of the wheel swing member is penetrated through the perforation of the first supporting element such that the first supporting element is connected with the wheel swing member.

In an embodiment, the wheel mouse further includes a second supporting element. The second supporting element has a notch. A second end of the wheel swing member is partially received in the notch of the second supporting element such that the wheel swing member is permitted to be swung with respect to the base.

In an embodiment, the wheel swing member further includes a triggering part, which is disposed at the second end of the wheel swing member.

In an embodiment, the wheel mouse further includes a wheel switch disposed on the circuit board and under the second end of the wheel swing member. When the scroll wheel is pressed down, the wheel swing member is moved downwardly toward the base, and the wheel switch is touched and triggered by the triggering part so as to issue a wheel button signal.

In an embodiment, when the wheel mouse in the tilt wheel operating mode and the scroll wheel is tilted toward the first side, the wheel swing member is swung with respect to the base and the first tilt switch is touched and triggered by the extension arm, thereby issuing a first tilt signal.

In an embodiment, the wheel mouse further includes a second tilt switch, which is disposed on a second side of the circuit board.

In an embodiment, when the wheel mouse in the tilt wheel operating mode and the scroll wheel is tilted toward the second side, the wheel swing member is swung with respect to the base and the second tilt switch is touched and triggered by the extension arm, thereby issuing a second tilt signal.

In an embodiment, the wheel mouse further includes a case for sheltering the base, wherein the case has an opening, and the scroll wheel is partially protruded outside the case.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

In order to obviate the drawbacks encountered from the prior art, the present invention provides a wheel mouse that is operable in two different wheel operating modes. In particular, the wheel mouse of the present invention can be operated in a third-axial wheel operating mode or a tilt wheel operating mode as required.

Figure 1:
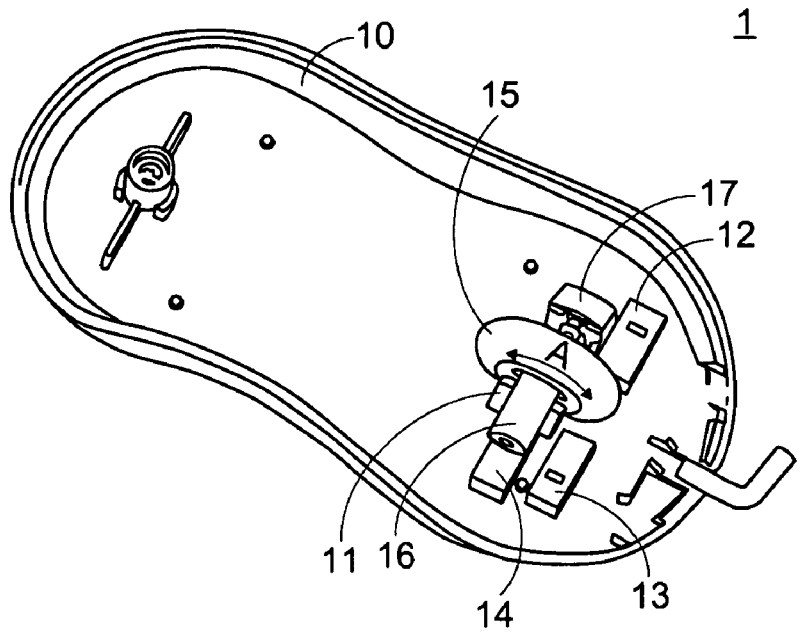
FIG. 1 is a schematic perspective view illustrating the internal portion of a conventional third-axial wheel mouse.
Figure 2:
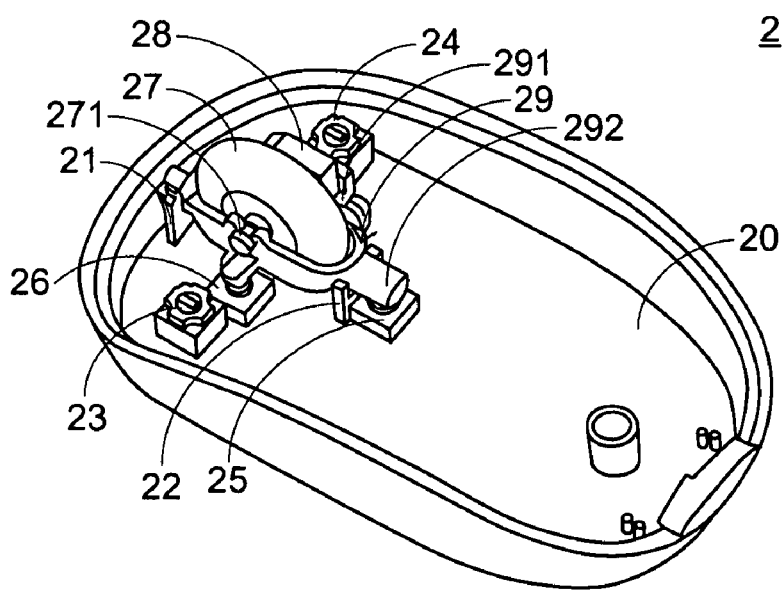
FIG. 2 is a schematic perspective view illustrating the internal portion of a conventional tilt wheel mouse.
Figure 3:
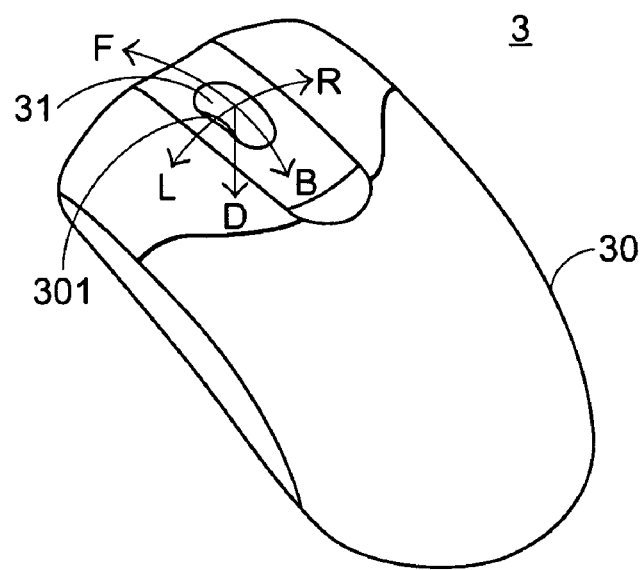
FIG. 3 is a schematic perspective view illustrating the outward appearance of a wheel mouse according to an embodiment of the present invention.

FIG. 3 is a schematic perspective view illustrating the outward appearance of a wheel mouse according to an embodiment of the present invention. As shown in FIG. 3, the wheel mouse 3 comprises a case 30 and a scroll wheel 31. The scroll wheel 31 is positioned within an opening 301 of the case 30 and partially protruded from the outer surface of the case 30, so that the scroll wheel 31 can be manipulated by a user. By rotating the scroll wheel 31 forwardly (in the direction F) or backwardly (in the direction B), the image shown on the computer screen is vertically scrolled. By tilting the scroll wheel 31 toward the right side (in the direction R) or the left side (in the direction L), the image shown on the computer screen is horizontally scrolled. In addition, when the scroll wheel 31 is pressed down (in the direction D), the wheel mouse 3 executes a wheel button function.

Figure 4A:
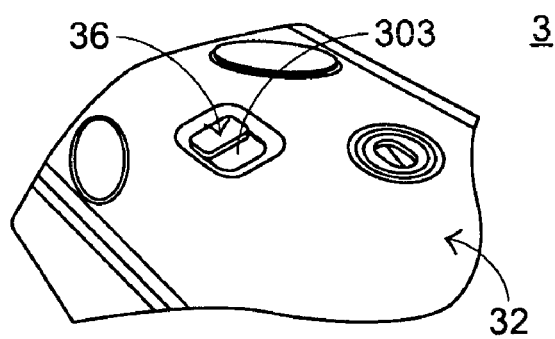
FIG. 4A is a schematic backside view illustrating the wheel mouse of the present invention in a third-axial wheel operating mode.

FIG. 4A is a schematic backside view illustrating the wheel mouse of the present invention in a third-axial wheel operating mode. A bottom hole 303 is formed in a base 32 of the wheel mouse 3. A mode-switching element 36 is disposed within the main body of the wheel mouse 3. The mode-switching element 36 is penetrated through the bottom hole 303 and partially protruded outside the surface of the base 32. In a case that the mode-switching element 36 is located in the first position (as shown in FIG. 4A), the wheel mouse 3 is in the third-axial wheel operating mode.

Figure 5:
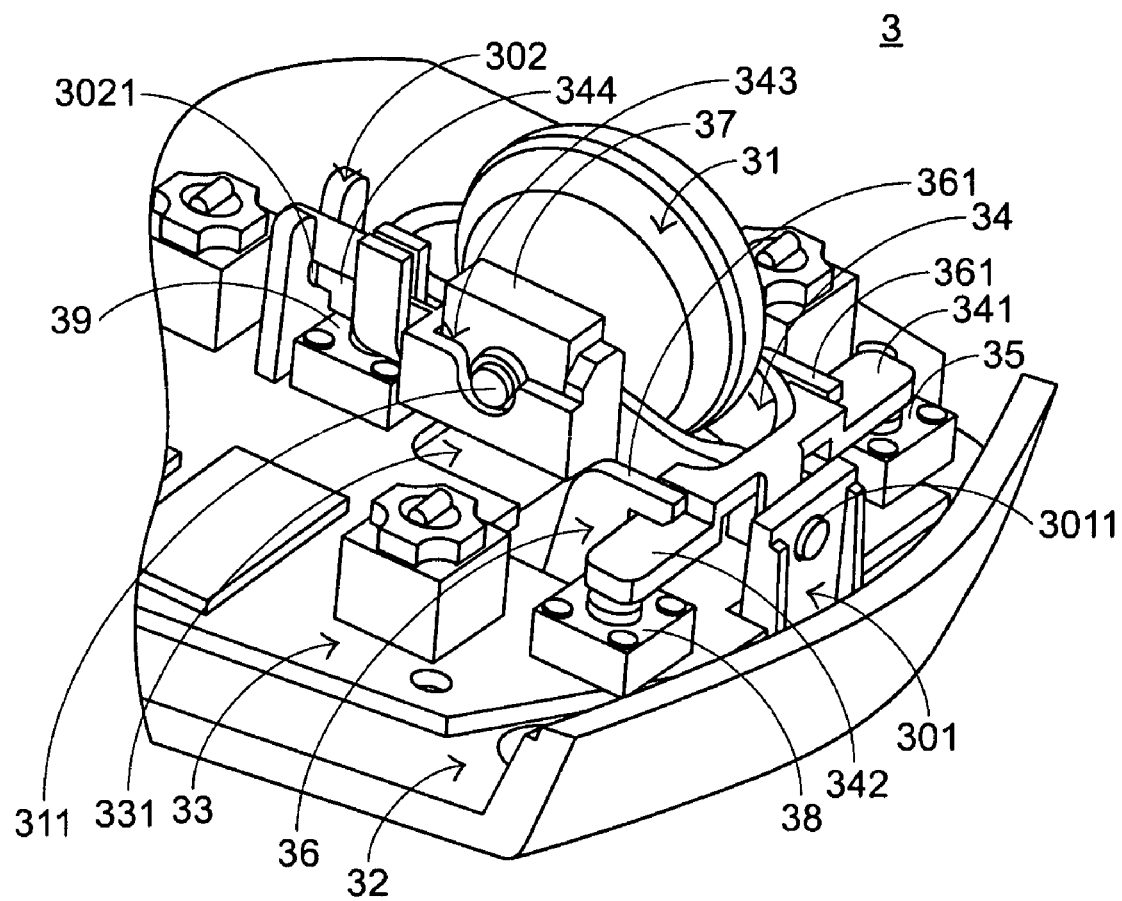
FIG. 5 is a schematic perspective view illustrating the internal portion of the wheel mouse in the third-axial wheel operating mode according to the embodiment of the present invention.

FIG. 5 is a schematic perspective view illustrating the internal portion of the wheel mouse in the third-axial wheel operating mode according to the embodiment of the present invention. The wheel mouse 3 comprises a base 32, a circuit board 33, a scroll wheel 31, a wheel swing member 34, a first tilt switch 35, a second tilt switch 38, a wheel switch 39 and the mode-switching element 36. The base 32 has the bottom hole 303 (as shown in FIG. 4A). In addition, the base 32 further has a first supporting element 301 and a second supporting element 302. The first supporting element 301 has a perforation 3011. The second supporting element 302 has a notch 3021. The circuit board 33 is disposed on the base 32. The circuit board 33 further includes a board hole 331. The mode-switching element 36 runs through the bottom hole 303 and the board hole 331.

The first tilt switch 35 and the second tilt switch 38 are disposed at a first side and a second side of the circuit board 33, respectively. The wheel swing member 34 is supported by the first supporting element 301 and the second supporting element 302 of the base 32. A first end of the wheel swing member 34 is penetrated through the perforation 3011 of the first supporting element 301. A second end of the wheel swing member 34 is partially received in the notch 3021 of the second supporting element 302. In such manner, the wheel swing member 34 can be swung with respect to the base 32. The wheel swing member 34 further includes a first extension arm 341 and a second extension arm 342. In a case that the wheel swing member 34 is tilted toward the right side (in the direction R), the first tilt switch 35 under the first extension arm 341 is touched and triggered by the first extension arm 341, thereby issuing a first tilt signal. In another case that the wheel swing member 34 is tilted toward the left side (in the direction L), the second tilt switch 38 under the second extension arm 342 is touched and triggered by the second extension arm 342, thereby issuing a second tilt signal.

Please refer to FIG. 5 again. The wheel swing member 34 further includes a receiving part 343 and a triggering part 344. The receiving part 343 is disposed at the first side of the wheel swing member 34 for accommodating the encoder 37. The scroll wheel 31 is accommodated within the wheel swing member 34. The scroll wheel 31 has a rotating shaft 311 inserted into the encoder 37. Upon rotation of the scroll wheel 31 forwardly (in the direction F) or backwardly (in the direction B), the encoder 37 generates a wheel rotation signal. The triggering part 344 of the wheel swing member 34 is disposed at the second end of the wheel swing member 34. The wheel switch 39 is mounted on the circuit board 33 and disposed under the second end of the wheel swing member 34. In a case that the scroll wheel 31 is pressed down (in the direction D), the wheel swing member 34 is moved downwardly with respect to the base 32. As the wheel swing member 34 is moved downwardly, the wheel switch 39 is touched and triggered by the triggering part 344, thereby issuing a switch button signal.

Figure 6:
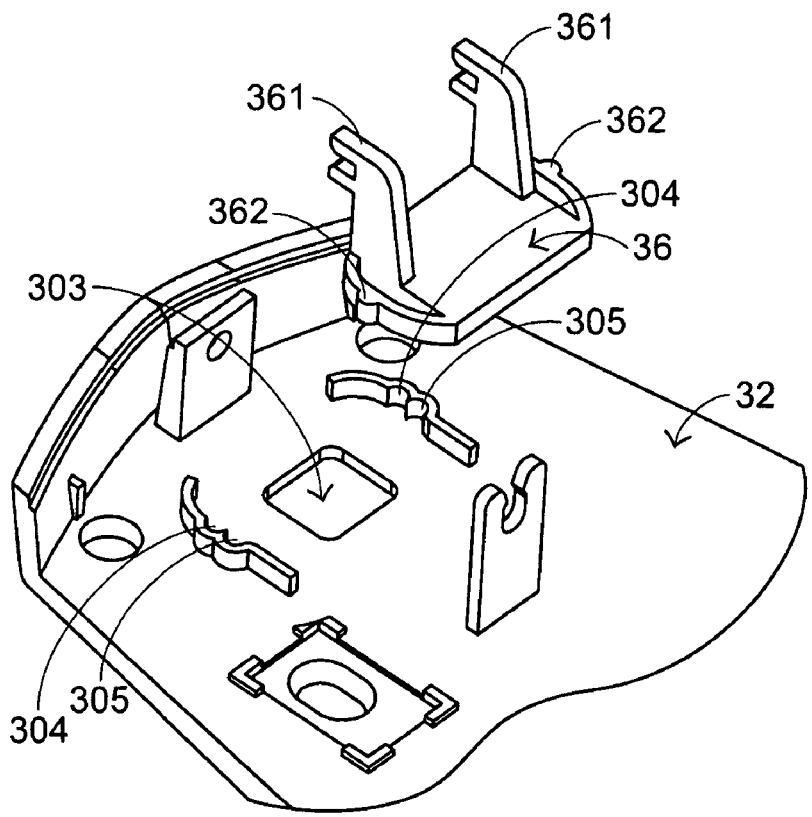
FIG. 6 is a schematic exploded view illustrating a portion of the wheel mouse according to the preferred embodiment of the present invention.

Hereinafter, the detailed structure of the mode-switching element 36 will be illustrated with reference to FIG. 6. FIG. 6 is a schematic exploded view illustrating a portion of the wheel mouse according to the preferred embodiment of the present invention. For clarification, only the mode-switching element 36 and the base 32 are shown in FIG. 6, but other components are not shown. As shown in FIG. 6, the mode-switching element 36 includes an engaging part 361 and a protruding part 362. In addition to the bottom hole 303, the base 32 further includes a first retaining recess 304 and a second retaining recess 305. The first retaining recess 304 and the second retaining recess 305 are disposed beside the bottom hole 303.

When the mode-switching element 36 is located in the first position (as shown in FIG. 4A), the engaging part 361 of the mode-switching element 36 is engaged with the first extension arm 341 and the second extension arm 342 such that the wheel swing member 34 becomes immobile. Under this circumstance, the wheel mouse 3 is in a third-axial wheel operating mode (see FIG. 5).

Figure 7:
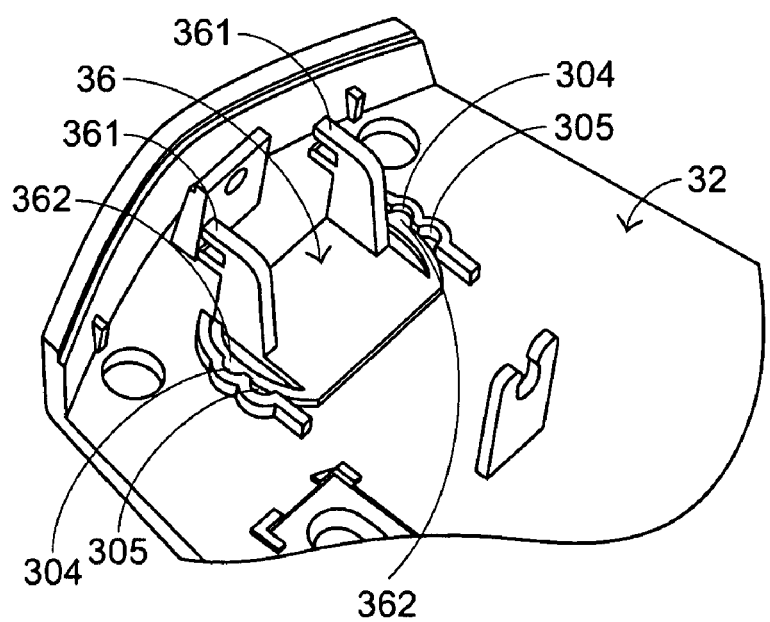
FIG. 7 is a schematic view illustrating the mode-switching element of the wheel mouse in the third-axial wheel operating mode according to the preferred embodiment of the present invention.

FIG. 7 is a schematic view illustrating the mode-switching element of the wheel mouse in the third-axial wheel operating mode according to the preferred embodiment of the present invention. The mode-switching element 36 is partially penetrated through the bottom hole 303 (see FIG. 6) and disposed on the base 32. When the protruding part 362 of the mode-switching element 36 is inserted into first retaining recess 304 or the second retaining recess 305, the mode-switching element 36 is fixed on the base 32 such that the mode-switching element 36 is not moved in the bottom hole 303. For example, as shown in FIG. 7, the mode-switching element 36 is adjusted to the first position and the protruding part 362 is inserted into the first retaining recess 304, so that the wheel mouse 3 is in the third-axial wheel operating mode.

Figure 4B:
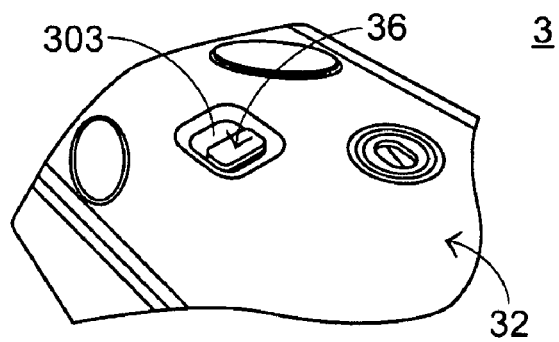
FIG. 4B is a schematic backside view illustrating the wheel mouse of the present invention in a tilt wheel operating mode.

For horizontally moving the web page or document shown on the screen by operating the wheel mouse 3, the user needs to move the mode-switching element 36 to the second position, so that the wheel mouse 3 is in a tilt wheel operating mode (as shown in FIG. 4B).

Figure 8:
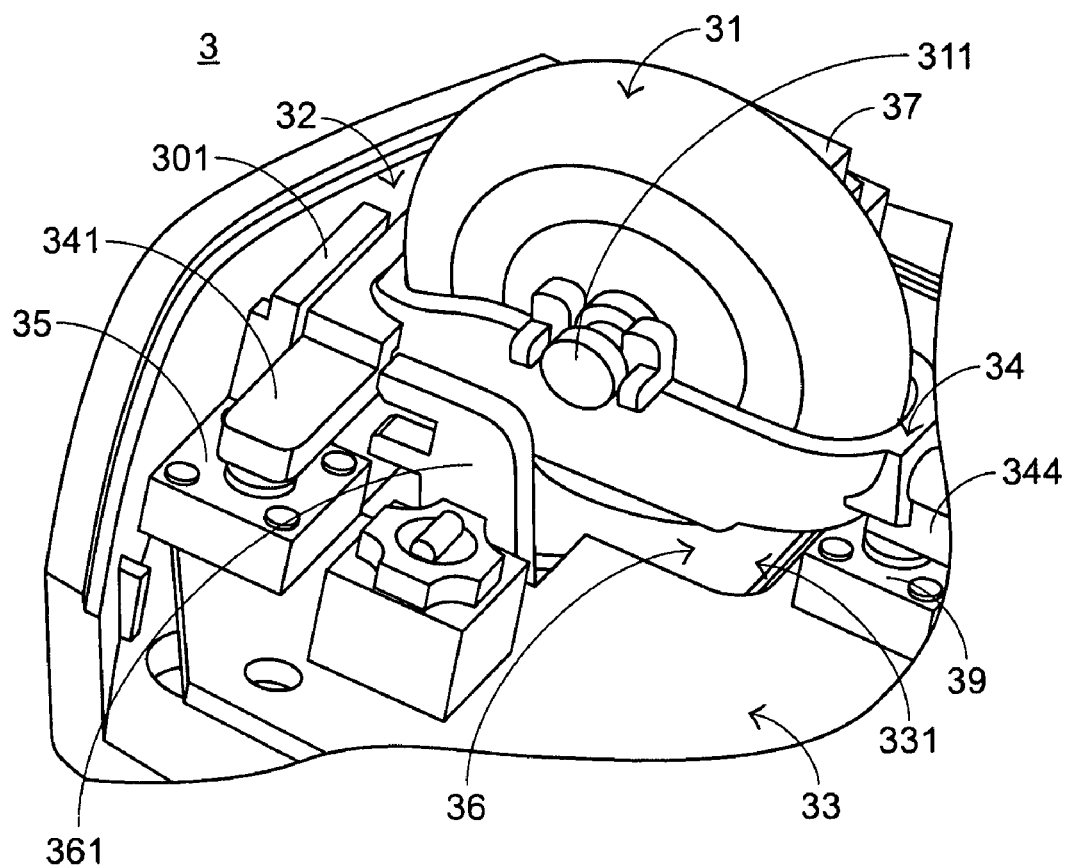
FIG. 8 is a schematic perspective view illustrating the internal portion of the wheel mouse in the tilt wheel operating mode according to the embodiment of the present invention.
Figure 9:
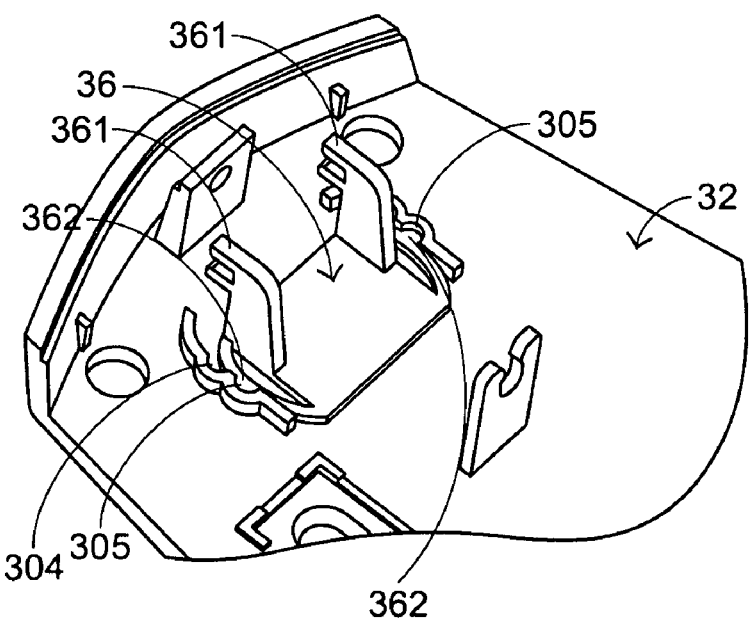
FIG. 9 is a schematic view illustrating the mode-switching element of the wheel mouse in the tilt wheel operating mode according to the preferred embodiment of the present invention.

FIG. 8 is a schematic perspective view illustrating the internal portion of the wheel mouse in the tilt wheel operating mode according to the embodiment of the present invention. The configurations of the wheel mouse 3 are identical to those illustrated above, and are not redundantly described herein. For operating the wheel mouse in the tilt wheel operating mode, the mode-switching element 36 is moved from the first position to the second position such that the engaging part 361 is separated from the first extension arm 341 and the second extension arm 342. Under this circumstance, the wheel swing member is permitted to be swung toward the right side or the left side. When the mode-switching element 36 is moved to the second position, the protruding part 362 is inserted into the second retaining recess 305 and thus the mode-switching element 36 is fixed on the base 32 (see FIG. 9).

From the above description, the wheel mouse of the present invention can be operated in two wheel operating modes. In particular, the wheel mouse of the present invention can be operated in a third-axial wheel operating mode or a tilt wheel operating mode by adjusting the mode-switching element to a first position or a second position. According to the user's preference, the user can adjust the operating mode of the wheel mouse of the present invention without difficulties. Since the use of the mode-switching element is sufficient to select a desired operating mode of the wheel mouse, the user need not purchase two different kinds of wheel mice. In other words, the wheel mouse of the present invention is more cost-effective in comparison with the prior art.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A wheel mouse comprising:
   a base having a bottom hole and a first supporting element;
   a circuit board disposed on said base and having a board hole;
   a first tilt switch disposed on a first side of said circuit board;
   a scroll wheel;
   a wheel swing member disposed on said base for accommodating said scroll wheel and permitting a rotating shaft of said scroll wheel to be swung with respect to said base, wherein
   a first end of said wheel swing member is connected to said first supporting element, and
   said wheel swing member has an extension arm arranged above said first tilt switch; and
   a mode-switching element penetrated through said bottom hole and said board hole, and comprising an engaging part,
   said mode-switching element capable of being located in a first position with respect to said base and a second position with respect to said base, wherein
   if said mode-switching element is located in said first position, said engaging part is engaged with said extension arm so that said rotating shaft of said wheel swing member is not permitted to swing with respect to said base and said wheel mouse is in a third-axial wheel operating mode, and
   if said mode-switching element is located in said second position, said engaging part is separated from said extension arm, so that said rotating shaft of said wheel swing member is permitted to be swung and said wheel mouse is in a tilt wheel operating mode.

2. The wheel mouse according to claim 1 further including an encoder, wherein said encoder generates a wheel rotation signal when said scroll wheel is rotated.

3. The wheel mouse according to claim 2 wherein said scroll wheel further includes a rotating shaft inserted into said encoder and rotated with said scroll wheel, so that said encoder generates said wheel rotation signal when said scroll wheel is rotated.

4. The wheel mouse according to claim 2 wherein said wheel swing member further includes a receiving part beside said wheel swing member for accommodating said encoder.

5. The wheel mouse according to claim 1 wherein said extension arm is integrally formed with said wheel swing member.

6. The wheel mouse according to claim 1 wherein said base further includes a first retaining recess and a second retaining recess beside said bottom hole.

7. The wheel mouse according to claim 6 wherein said mode-switching element further includes a protruding part to be inserted into said first retaining recess or said second retaining recess to fix said mode-switching element, wherein said mode-switching element is located in said first position when said protruding part is inserted into said first retaining recess, and said mode-switching element is located in said second position when said protruding part is inserted into said second retaining recess.

8. The wheel mouse according to claim 1 wherein said first supporting element has a perforation, and said first end of said wheel swing member is penetrated through said perforation of said first supporting element such that said first supporting element is connected with said wheel swing member.

9. The wheel mouse according to claim 8 further including a second supporting element, wherein said second supporting element has a notch, and a second end of said wheel swing member is partially received in said notch of said second supporting element such that said wheel swing member is permitted to be swung with respect to said base.

10. The wheel mouse according to claim 9 wherein said wheel swing member further includes a triggering part, which is disposed at said second end of said wheel swing member.

11. The wheel mouse according to claim 10 further including a wheel switch disposed on said circuit board and under said second end of said wheel swing member, wherein when said scroll wheel is pressed down, said wheel swing member is moved downwardly toward said base, and said wheel switch is touched and triggered by said triggering part so as to issue a wheel button signal.

12. The wheel mouse according to claim 1 wherein when said wheel mouse in said tilt wheel operating mode and said scroll wheel is tilted toward said first side, said wheel swing member is swung with respect to said base and said first tilt switch is touched and triggered by said extension arm, thereby issuing a first tilt signal.

13. The wheel mouse according to claim 1 further including a second tilt switch, which is disposed on a second side of said circuit board.

14. The wheel mouse according to claim 13 wherein when said wheel mouse in said tilt wheel operating mode and said scroll wheel is tilted toward said second side, said wheel swing member is swung with respect to said base and said second tilt switch is touched and triggered by said extension arm, thereby issuing a second tilt signal.

15. The wheel mouse according to claim 1 further including a case for sheltering said base, wherein said case has an opening, and said scroll wheel is partially protruded outside said case.

* * * * *